(12) United States Patent
Deshmukh et al.

(10) Patent No.: US 8,364,775 B2
(45) Date of Patent: Jan. 29, 2013

(54) HIGH AVAILABILITY MANAGEMENT SYSTEM FOR STATELESS COMPONENTS IN A DISTRIBUTED MASTER-SLAVE COMPONENT TOPOLOGY

(75) Inventors: Harish Deshmukh, Mountain View, CA (US); Sridhar Rajagopalan, Liverpool (GB); Roger C. Raphael, San Jose, CA (US); Chitrang Shah, San Carlos, CA (US); Paul S. Taylor, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 12/855,241

(22) Filed: Aug. 12, 2010

(65) Prior Publication Data

US 2012/0042030 A1 Feb. 16, 2012

(51) Int. Cl.
*G06F 15/16* (2006.01)
(52) U.S. Cl. ........ 709/208; 709/221; 709/245; 709/223; 709/250; 370/221; 370/242
(58) Field of Classification Search .................. 709/221, 709/245, 207, 223, 250; 370/221, 242
See application file for complete search history.

(56) References Cited

U.S. PATENT DOCUMENTS

| | | | |
|---|---|---|---|
| 6,604,207 B2 | 8/2003 | Sheikh et al. | |
| 6,847,993 B1 | 1/2005 | Novaes et al. | |
| 7,043,563 B2 | 5/2006 | Vange et al. | |
| 7,502,841 B2 | 3/2009 | Small et al. | |
| 7,518,987 B2 | 4/2009 | Biswas et al. | |
| 2002/0007468 A1* | 1/2002 | Kampe et al. | 714/4 |
| 2003/0046230 A1 | 3/2003 | Jacobs et al. | |
| 2003/0229775 A1* | 12/2003 | Schelling | 713/1 |
| 2004/0034822 A1* | 2/2004 | Marchand | 714/712 |
| 2006/0168084 A1 | 7/2006 | Kogan et al. | |
| 2007/0041327 A1* | 2/2007 | Foster et al. | 370/242 |
| 2007/0294563 A1 | 12/2007 | Bose | |
| 2008/0089361 A1* | 4/2008 | Metcalf et al. | 370/474 |
| 2009/0216910 A1 | 8/2009 | Duchesneau | |
| 2009/0232041 A1* | 9/2009 | Smith | 370/312 |

FOREIGN PATENT DOCUMENTS

EP 1840741 A1 10/2007

OTHER PUBLICATIONS

International Search Report and Written Opinion for Patent Cooperation Treaty Application Serial No. PCT/EP2010/062894 dated Dec. 17, 2010.
"Service Availability Forum Application Interface Specification: Availability Management Framework," AssociationVoice, Oct. 2008: pp. 1-13, 33-95 and 230-244, <http://www.saforum.org/HOA/assn16627/images/SAI-AIS-AMF-B.04.01.pdf>, retrieved Nov. 18, 2010.
"Service Availability Forum: Specifications," AssociationVoice, Oct. 2008: pp. 1-4, <http://www.saforum.org/link/linkshow.asp?link_id=222259&assn_id=16627>, retrieved Nov. 18, 2010. Office Action History of U.S. Appl. No. 12/578,372 from Feb. 28, 2011 to Aug. 9, 2011.
U.S. Appl. No. 12/578,372, filed Oct. 13, 2009.
Kostopoulos et al., "NASS-IMS bundled Authentication Study through Core Network Concepts," Proceedings of the 3rd International Conference on Mobile Multimedia Communications, ACM International Conference Proceeding Series, 2007 vol. 329(46): pp. 1-6.

\* cited by examiner

*Primary Examiner* — Thuong Nguyen
(74) *Attorney, Agent, or Firm* — Patterson & Sheridan, LLP

(57) ABSTRACT

Systems, methods and computer program products are disclosed for managing availability of a slave components executing in a distributed system. A master server and a heartbeat protocol may be provided. The heartbeat protocol may define state machines for the master server and/or the slave components. The master server and/or the slave components may act in accordance with the state machines to manage availability of the slave components in the distributed system.

24 Claims, 10 Drawing Sheets

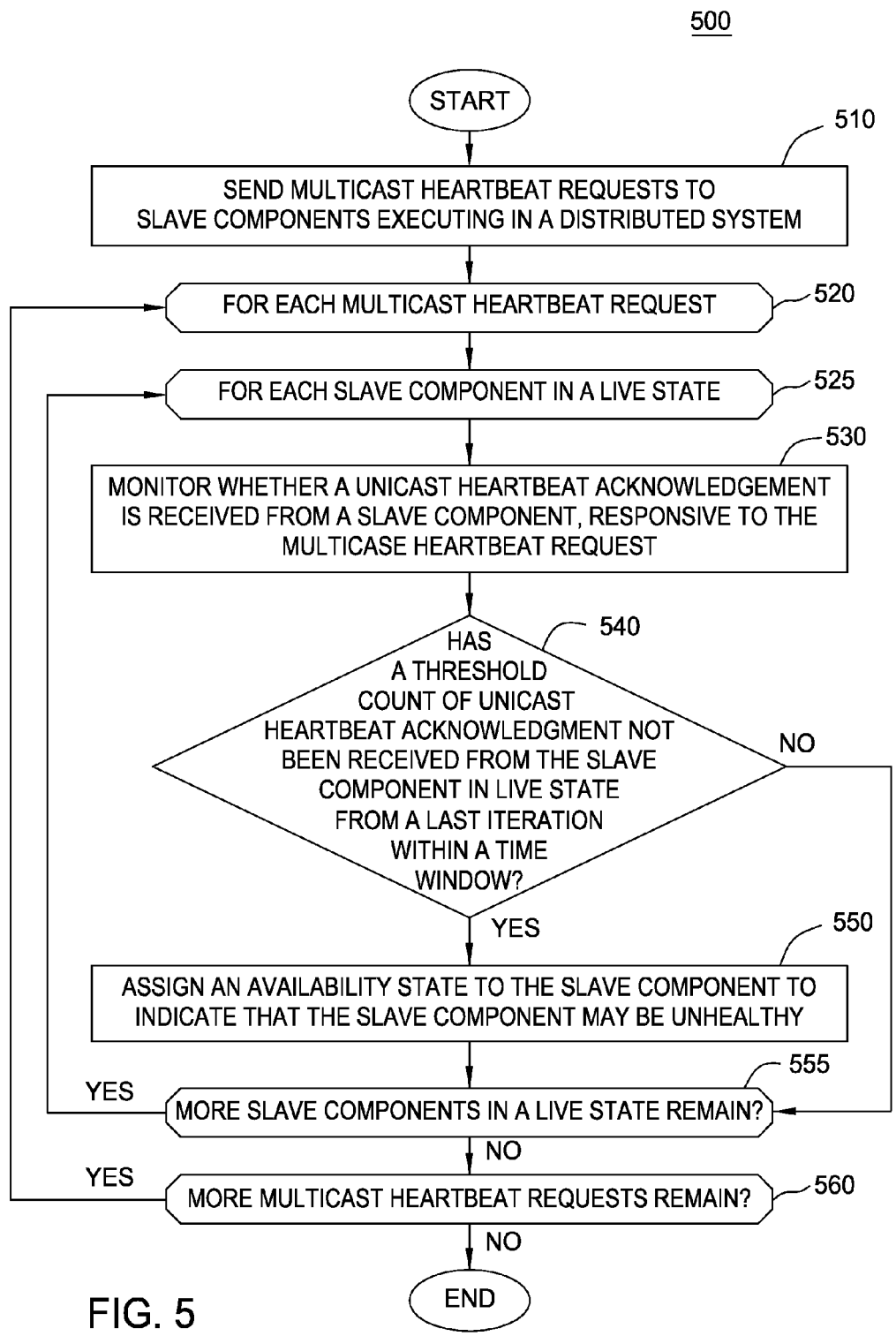

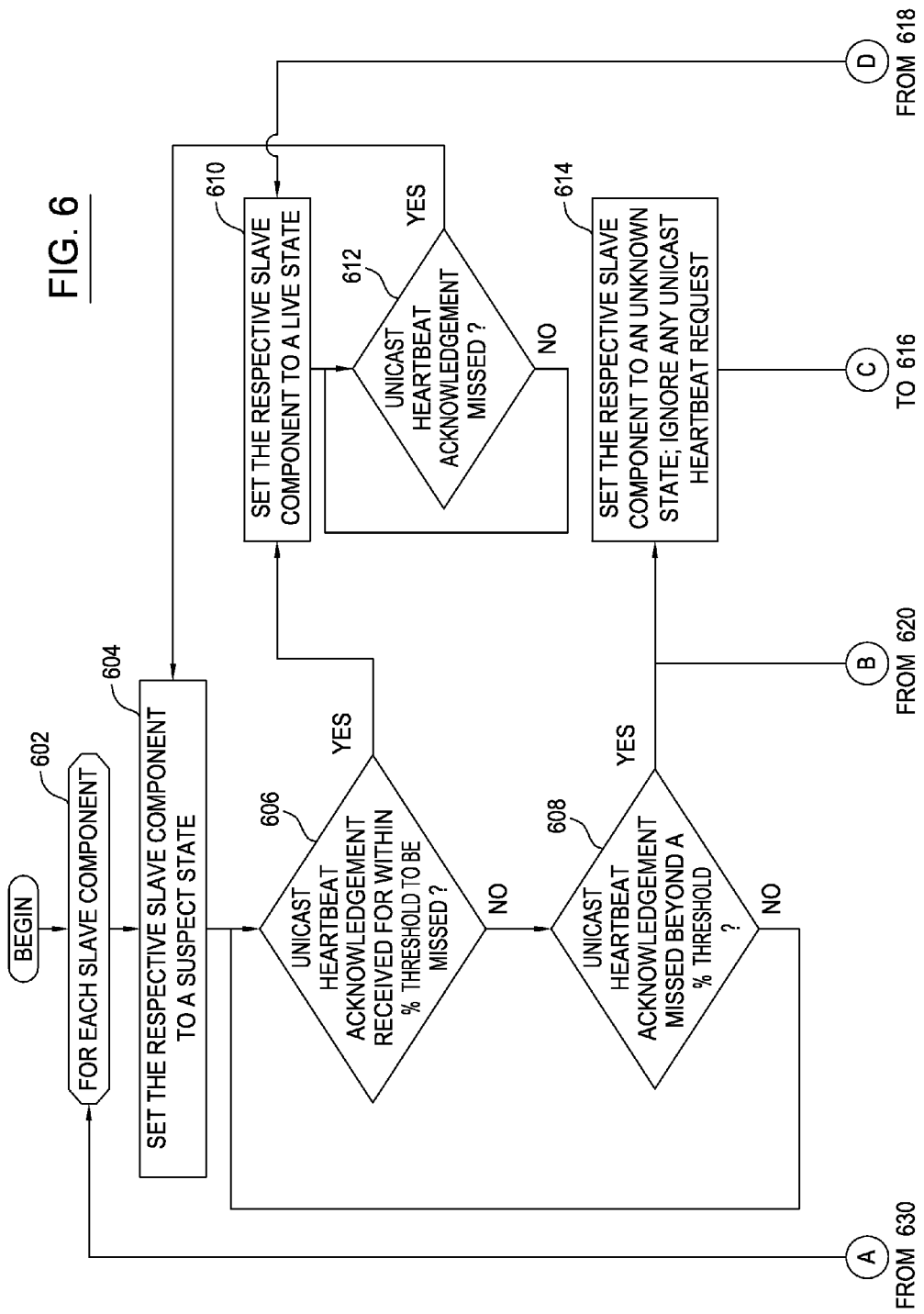

| | | |
|---|---|---|
| INTEGER DataGramLength | // Used to check for truncated DGRAM | |
| INTEGER HeaderLength | // Header Length | |
| INTEGER Magic/Signature; | // Magic | |
| INTEGER MessagetType; | // Message Type 1-HBR 2- HBA | |
| INTEGER CommandCode; | // Command Code | |
| INTEGER DomainIdentifier; | // Domain ID | |
| INTEGER ComponentType; | // Component Type There could be a multitude of Slave Types each numbered 1 ... N , 0 is Master Type. | |
| INTEGER ComponentIdentifier; | // Component Instance Number 0 for Master and Slaves were numberd 1... N . | |
| INTEGER SubComponentIdentifier; | // Sub Component ID. | |
| LONGINTEGER SourceIpAddress; | // Source IP | |
| INTEGER SourcePort; | // Source IP port | |
| INTEGER EventIdentifier; | // Ordered Event Id from source | |
| LONG INTEGER TimeStamp; | // Cannonical timestamp Used to Synchronize Clocks at Master. | |
| INTEGER PayLoadLength; | // Payload Length | |
| PAYLOAD BYTES VARIABLE; | // Payload Bytes | |

FIG. 8

HIGH AVAILABILITY MANAGEMENT SYSTEM FOR STATELESS COMPONENTS IN A DISTRIBUTED MASTER-SLAVE COMPONENT TOPOLOGY

BACKGROUND

Embodiments of the invention relate generally to distributed systems and more specifically to techniques for managing availability of one or more components in a distributed system.

Distributed applications include software components running on different computers and interacting with each other via a network, frequently as part of a larger distributed system. Examples of distributed applications include scalable information retrieval and/or document processing applications (such as content management environments) that exploit machine-level parallelism. A distributed application may be configured to detect system failures, such as failures in hardware, software, network, etc.

SUMMARY

Embodiments of the invention provide a computer-implemented method, computer program product, and system for performing an operation for managing availability of a plurality of slave components executing in a distributed system. The operation may generally include sending a plurality of multicast heartbeat requests to the plurality of slave components executing in the distributed system. The operation may also include monitoring, for each multicast heartbeat request, whether a unicast heartbeat acknowledgment is received from the respective slave component, responsive to the respective multicast heartbeat request. The operation may also include assigning, upon determining that a count of unicast heartbeat acknowledgments not received from one of the slave components exceeds a predefined threshold, an availability state to the slave component to indicate a health status of the slave component.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 is a flowchart depicting a method for managing availability of slave components in a distributed system, according to one embodiment of the invention.

FIG. 8 depicts exemplary source code defining a data structure of a multicast heartbeat acknowledgment and/or a unicast heartbeat response, according to one embodiment of the invention.

DETAILED DESCRIPTION

Figure 1A:
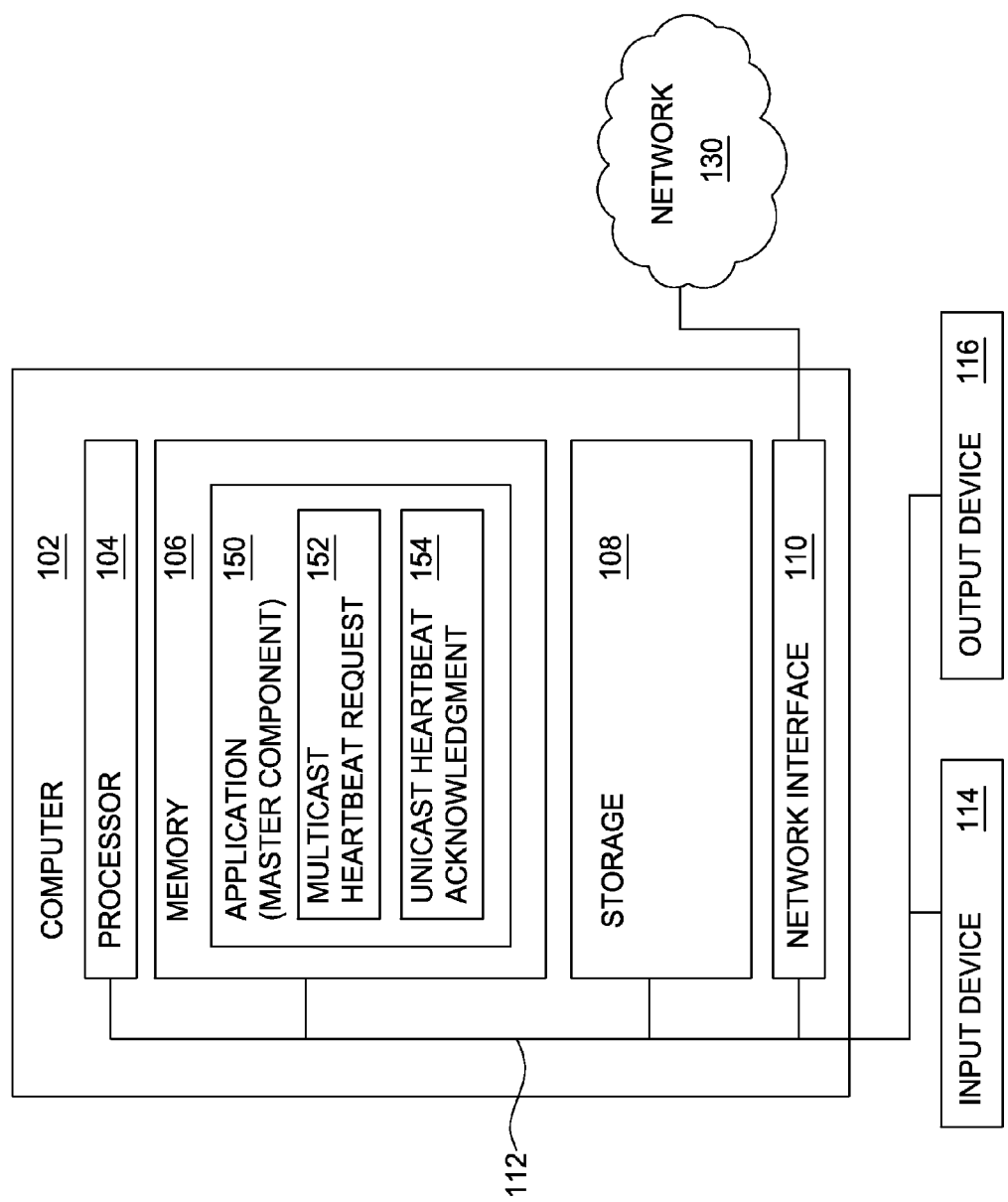
FIGS. 1A-1B are block diagrams illustrating systems for managing availability of slave components, according to one embodiment of the invention.

Embodiments of the invention provide techniques for managing availability of slave components in a distributed system. One embodiment of the invention provides a master server and a heartbeat protocol. The heartbeat protocol may define state machines for the master server and/or the slave components. The master server and/or the slave components act in accordance with the state machines to manage availability of the slave components in the distributed system. For example, the heartbeat protocol may specify that the master server manages availability of the slave components by sending multicast heartbeat requests to the slave components and monitoring whether unicast heartbeat acknowledgments are received from the slave components. Accordingly, the master server may more effectively manage the availability of the slave components executing in the distributed system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1B:
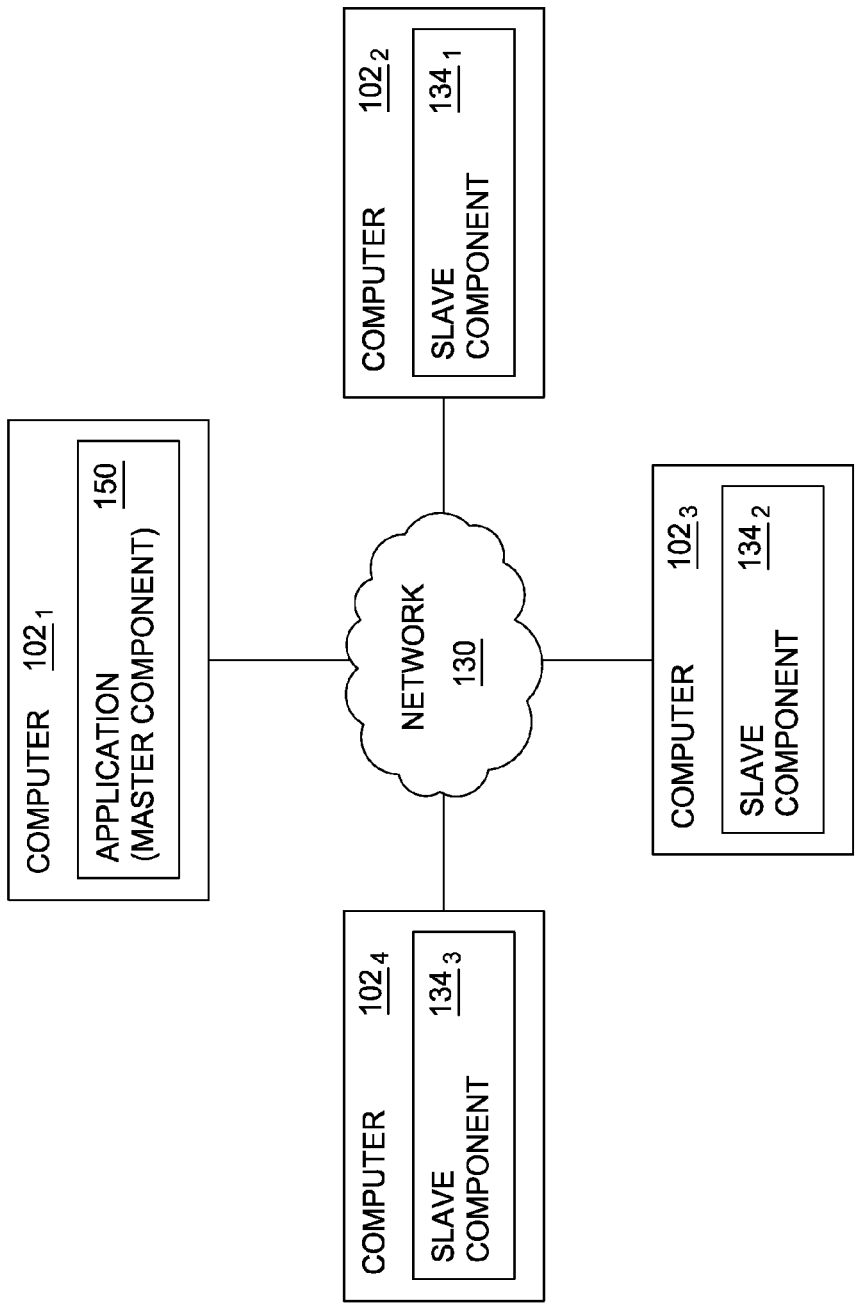

FIGS. 1A-1B are a block diagrams illustrating systems 100, 150 for managing availability of slave components, according to one embodiment of the invention. As shown in FIG. 1A, the networked system 100 includes a computer 102. The computer 102 may also be connected to other computers via the network 130. In general, the network 130 may be a telecommunications network and/or a wide area network (WAN). In a particular embodiment, the network 130 is a local area network (LAN). In an alternative embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 146. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

In one embodiment, the networked system 100 includes multiple computers connected via the network 130 and each executing a component. In one embodiment, a component refers to an application that encapsulates a set of related functions (and/or data). Further, each component may be configured to act as a standalone server. Each component may also be configured to act in accordance with a slave state machine or a master state machine. A component acting in accordance with a slave state machine may be referred to as a slave component, while a component acting in accordance with a master state machine may be referred to as a master component. Depending on the embodiment, a component may include native source code or interpreted code. An example of a component is a software application that provides a service to one or more applications locally and/or via the network 130 (i.e., a server component).

As shown, the memory 106 of the computer 102 includes an application 150 for managing availability of slave components, according to one embodiment of the invention. The application 150 may manage, via the network 130, availability of one or more slave components and may correspond to the master component described above. As such, the application 150 may also be referred to as a master component, a master server or a master process.

In one embodiment, the master component and the slave components form a distributed system. That is, the distributed system includes a set of components deployed across a set of nodes, where the set of components include at least one master component and at least one slave component. The master component may provide a service of the distributed application to the outside world (e.g., one or more devices, applications and/or users). Depending on the embodiment, interaction of the master component with the outside world may be transactional, such as where the application 150 operates in conjunction with the slave components to provide a distributed document processing or information retrieval system. Alternatively or additionally, interaction of the master component with the outside world may be stateful—e.g., the master component may process requests from a client and persist the state from previous exchanges with the client.

In one embodiment, each slave component provides a service to the master component and/or one or more other slave components. Depending on the embodiment, the exchanges that occur between a slave component and a master component and/or another slave component may be stateless. In other words, the exchanges may be atomic and no information is necessarily carried across the exchanges.

FIG. 1B illustrates the networked system 150 for managing availability of slave components, according to one embodiment of the invention. As shown, the computer $102_1$ is connected to other computers $102_2$, $102_3$, $102_4$, via the network 130. The other computers $102_2$, $102_3$, $102_4$ each execute a respective slave component 134. Although the computers $102_2$, $102_3$, $102_4$ are shown executing only one slave component 134, depending on the embodiment, each computer $102_1$, $102_2$, $102_3$, $102_4$, may execute multiple slave components 134. Further, the computer $102_1$ executing the master component may also execute one or more slave components 134. The master component may include at least two subcomponents (not shown): a multicast heartbeat request transmitter and a unicast heartbeat acknowledgment receiver. Further, each slave component 134 may include at least two subcomponents (not shown): a multicast heartbeat request receiver and a unicast heartbeat acknowledgment transmitter. In one embodiment, each slave component 134 is stateless. In an alternative embodiment, at least one of the slave components 134 is stateless, while the master component is stateful.

In one embodiment, the application 150 communicates with the slave components 134 using multicast. Multicast refers to a technique for one-to-many communication over a network. Internet Protocol (IP) multicast refers to a technique for one-to-many communication over an IP infrastructure in the network. Using IP multicast, the application 150 may send a datagram once, even if the datagram is to be delivered to multiple slave components. Nodes in the network (e.g., routers or other computing devices) replicate the packet to reach the multiple slave components.

In one embodiment, the IP multicast functionality, upon which the master component relies, is implemented in a software driver within the master component. In an alternative embodiment, the IP multicast functionality is implemented in a network controller and/or routers that form the network 130.

In one embodiment, the application 150 may use an IP multicast group address to send datagrams. For example, the application 150 may use the IP multicast group address as the IP destination address in the datagrams. The slave components may use the IP multicast group address to join the IP multicast group. For example, the slave components may use Internet Group Management Protocol (IGMP) to join an IP multicast group.

In one embodiment, once a slave component has joined the IP multicast group, the slave component receives, via the IP multicast group address, datagrams send by the application 150. For example, under Internet Protocol version 4 (IPv4), addresses 224.0.0.0 to 239.255.255.255 may be designated as multicast addresses. The application 150 may send a single datagram (from a unicast address of the application 150) to a multicast address.

In one embodiment, after the application 150 sends the single datagram to the multicast address, intermediary routers in the network 130 then make copies of the datagram and deliver the copies to all slave components that have registered an interest in receiving datagrams at the multicast address. In response, each slave component sends a unicast datagram to the application 150. Unicast refers to a technique for one-to-one communication over a network. And while embodiments are described herein with reference to Internet Protocol version 4 (IPv4), other embodiments, such as Internet Protocol version 6 (IPv6), are broadly contemplated.

Figure 2:
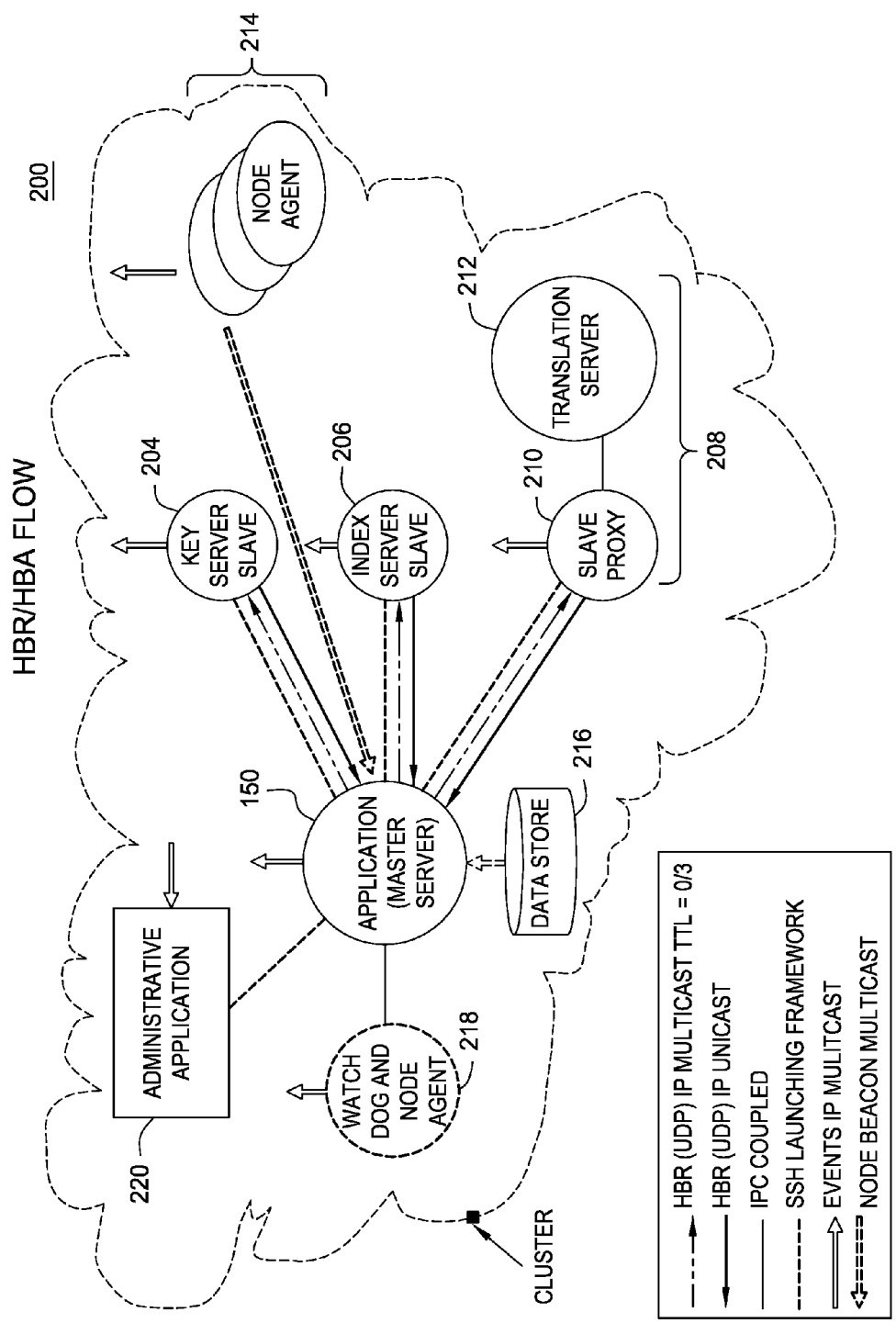
FIG. 2 illustrates a system for managing availability of slave components, according to one embodiment of the invention.

In one embodiment, the application 150 communicates with the slave components 134 according to a heartbeat protocol to manage availability of the slave components 134. FIG. 2 illustrates a system 200 for managing availability of slave components 134, according to one embodiment of the invention. As shown, the system 200 includes the application 150, slave components 204, 206, 208, a watch dog and node agent 218, and an administrative application 220. In one embodiment, the master component may be a content indexing controller that is connected to a data store 216. The slave components 204, 206, 208 may be of different types, e.g., a key server slave, an index server slave, and a translation slave.

In one embodiment, each slave component type may be designated by an administrative user as being critical or non-critical. Upon determining that no instances of a critical component type are available, the application 150 may be configured to terminate, whereby the distributed system becomes unavailable. For example, the administrative user may designate the key server slave and the index server slave as being critical and the translation slave as being non-critical. If no instances of the key server slave component are available or if no instances of the translation slave component are available, the application 150 may terminate itself—regardless of the number of instances of the translation slave component being available. Depending on the embodiment, an administrative user may specify the number of instances required for each critical slave component type to prevent the application 150 from terminating itself.

In one embodiment, the watch dog/node agent 218, 214 refers to functionality provided by an operating system to automatically restart a component if the component terminates. An example on the Microsoft® Windows® operating system there is the Windows services managed by the Service Control Manager (SCM). The administrative application 220 may be an administrative console configured to manage all the software components and other artifacts of the system, based on user input.

As shown in FIG. 2, one slave component 208 includes a proxy server process 210 for a component 212 that executes in an address space that is closed to the rest of the distributed system. In this particular example, the component 212 is translation server. Further, the component 212 may also be closed to modification and/or extension by a developer of the distributed application. In one embodiment, the proxy server process 210 initiates the component 212 and analyzes a state of the component 212 to determine the availability of the component 212. For example, the proxy server process 210 may analyze the state of the component 212 using inter-process communication (IPC) (such as redirecting a shared library or using named pipes) and/or operating system primitives (such as the UNIX kill function or SIGCHLD signal). The proxy server process 210 may then transmit the determined availability to the distributed system via an availability protocol of the distributed system. Accordingly, the application 150 monitors, via the proxy server process 210, the availability of the component having the closed address space. The distributed system may also control the availability of the component via the proxy server process 210.

Figure 3:
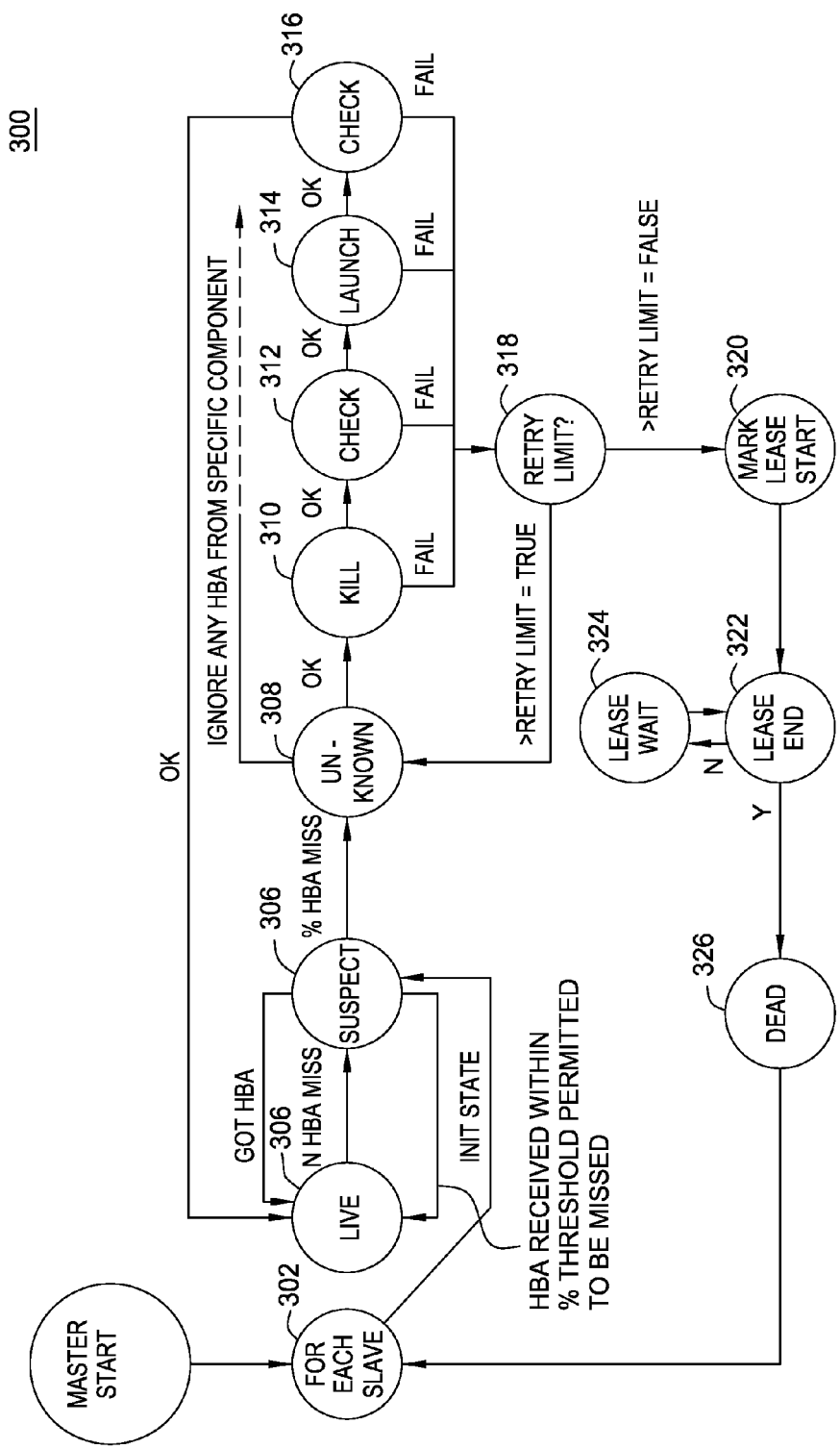
FIG. 3 illustrates a state machine for a master component, according to one embodiment of the invention.

In one embodiment, the heartbeat protocol specifies that the application 150 and the slave components 134 act according to predefined state machines. FIG. 3 illustrates a state machine 300 for the application 150, according to one embodiment of the invention. As shown, the application 150 initializes a suspect state for each slave component (states 302 and 304). The application 150 may transition into the one of the predefined states of the state machine as the application 150 sends multicast heartbeat requests to the slave components 134. That is, the application 150 may maintain one of the predefined states for each of the slave components 134 in the distributed system. If the application 150 receives N unicast heartbeat acknowledgments from a slave component 134, the application 150 may transition from a suspect state 304 to a live state 306 for the slave component 134. The value of N may be a predetermined numeric value that is tunable to the conditions of the network 130, e.g., response times, congestion attributes, etc. In one embodiment, N may be adapted autonomously using feedback such as slave component function type, message performance history and dynamic conditions of the node and/or network, etc. However, the value of N=1 has led to acceptable behavior in at least some cases.

Alternatively, in one embodiment, if the application 150 receives more unicast heartbeat acknowledgments from the slave component 134 than a threshold percentage of unicast heartbeat acknowledgments expected to be received, the application 150 may also transition from the suspect state 304 to the live state 306. For example, assume that the threshold percentage is 75% of expected unicast heartbeat acknowledgments (i.e., up to 25% of unicast heartbeat acknowledgments are permitted to be missed). In one embodiment, if the application 150 receives only 7 out of 10 heartbeat acknowledgments expected from the slave component 134, the application 150 may still transition from the suspect state 304 to the live state 306 for the slave component 134.

In one embodiment, if the application 150 is in the live state 306 for a slave component 134 and does not receive a unicast heartbeat acknowledgment from the slave component 134 (responsive to a next multicast heartbeat request), the application 150 may transition from the live state 306 to the suspect state 304 for the slave component 134. Further, if the application 150 is in the suspect state 304 for a slave component 134 and receives fewer unicast heartbeat acknowledgments from the slave component 134 than a second threshold percentage, the application 150 may transition from the suspect state 304 to an unknown state 308 for the slave component 134. For example, assume that the second threshold percentage is 50% of expected unicast heartbeat acknowledgments. In one embodiment, if the application 150 receives less than 5 out of 10 heartbeat acknowledgments expected from the slave component 134, the application 150 may transition from the suspect state 304 to the unknown state 308 for the slave component 134.

In one embodiment, once the application 150 has transitioned to the unknown state 308 for the slave component 134, the application 150 may ignore any heartbeat acknowledgments from the slave component 134 and attempt to kill and restart the slave component 134. For example, the application 150 may transition from the unknown state 308 to a kill state 310 for the slave component 134. The application 150 may attempt to terminate the slave component (state 310) and verify whether the attempt is successful (state 312). If so, the application 150 may attempt to restart the slave component (state 314) and check whether the attempt is successful (state 316). If so, the application 150 transitions from the state 316 to the live state 306 for the restarted slave component 134.

However, if the application 150 does not successfully terminate and restart with a new instance of the slave component 134, the application 150 may transition to a retry state 318 for the slave component 134, according to one embodiment. The application 150 may maintain a counter associated with the retry state 318. The application 150 may increment the counter upon each transition into the retry state 318. If the counter is less than a predefined "retry limit" threshold, the application 150 may transition from the retry state 318 back to the unknown state 308 for the slave component 134.

However, if the counter is greater than or equal to the retry limit, the application 150 may transition from the retry state 318 to a lease start state 320 for the slave component, according to one embodiment. At the lease start state 320, the application 150 may mark a beginning of a lease for the slave component 134. In one embodiment, a lease refers to a predefined time period before declaring that a slave component 134 is dead. The lease is further described below in conjunction with FIG. 4. Once the lease for the slave component 134 elapses (states 322 and 324), the application 150 may transition into a dead state 326 for the slave component 134. The application 150 may then return to the state 302 to monitor another slave component 134.

In one embodiment, the heartbeat protocol also specifies that the application 150 may be restarted without requiring any of the slave components 134 to be terminated or restarted. For example, each slave component 134 may inspect and extract a source IP address from a heartbeat request previously received from the application 150. Each slave component 134 may then respond with a heartbeat acknowledgment to a surviving master, based on the extracted source IP address. For example, the source IP address may be obtained by introspecting the underlying IP datagram headers. In an alternative embodiment, the source IP address and port of the sender may be extracted from the payload if the individual slave components 134 include a respective IP address within the payload. Extracting the source IP address and port of the sender is further discussed below in conjunction with FIG. 8.

Figure 4:
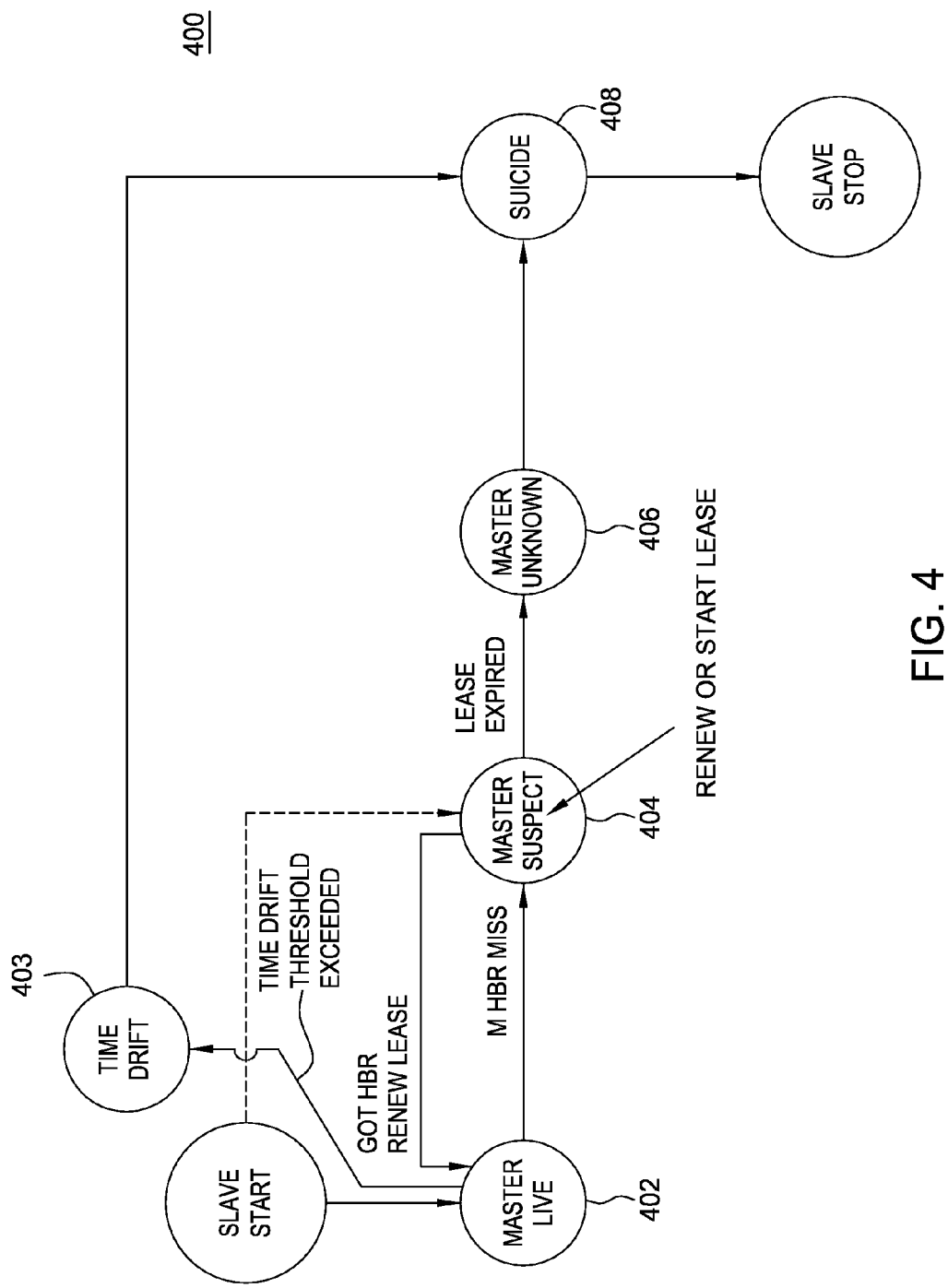
FIG. 4 illustrates a state machine for a slave component, according to one embodiment of the invention.

FIG. 4 illustrates a state machine 400 for a slave component 134, according to one embodiment of the invention. As shown, the slave component 134 transitions into a "master live" state 402. Upon not receiving M heartbeat requests that are expected from the application 150, the slave component transitions from the master live state 402 to a master suspect state 404. The value of M may be a predetermined numeric value that is tunable to the conditions of the network 130, e.g., response times, congestion attributes, master load, number of slave components in the network, etc. In one embodiment, the value of M may be adapted autonomically using feedback such as a message performance history of the master component, dynamic conditions of the node and/or network, etc. However, the value of M=1 has led to acceptable behavior in at least some cases.

In one embodiment, when in the master suspect state 404, the slave component 134 may start or renew a lease. Further, if the slave component 134 receives a next heartbeat request, then the slave component 134 may renew a lease and transition back to the master live state 402. In an alternative embodiment, upon starting, the slave component 134 may transition into the master suspect state 404 (as shown by dotted lines in FIG. 4) rather than the master live state 402.

In an alternative embodiment, from the master live state 402, the slave component 134 may also transition to a time drift state relative to the master component. The time drift state is taken if the local, real-time clock of the processor in question has drifted beyond a predefined, acceptable threshold, relative to a local clock of the master component. Accordingly, the expiration of leases for participating nodes in the network may be managed more efficiently. If the drift is beyond a tolerable limit, the slave component 134 may then transition from the time drift state 403 to a suicide state 408.

However, if the lease expires while the slave component 134 is in the master suspect state 404, the slave component 134 may transition into a master dead state 406, according to one embodiment. The slave component 134 may then transition into the suicide state 408. In some embodiments, the slave component 134 transitions from the master suspect state 404 to the suicide state 408 in no more than 1.5 lease periods. In one embodiment, the lease period refers to a quantity of elapsed time that is used by a slave component to form a time window within which to count how many multicast heartbeat requests have arrived. Further, as previously described in conjunction with FIG. 3, the master component may also use a lease period to form a time window within which to count how many unicast heartbeat acknowledgments have been received. Depending on the embodiment, the lease periods used by the slave components and the master component may be the same or differ and may be adapted based on node capability and/or network performance. After transitioning into the suicide state 408, the slave component 134 terminates. Depending on the embodiment, an external node agent may specify that the slave component 134 does not restart itself (i.e., the slave component 134) by marking a local persistent state to indicate a fatal-and-no-restart condition. This condition of not restarting an instance of the slave component 134 may only be cleared administratively, according to one embodiment.

FIG. 5 is a flowchart depicting a method 500 for managing availability of slave components 134 in a distributed system, according to one embodiment of the invention. As shown, the method 500 begins at step 510, where the application 150 sends multicast heartbeat requests to slave components 134 executing in the distributed system. At step 520, the application 150 enters a loop for the sent multicast heartbeat requests. At step 525, the application 150 enters a loop for each slave component 134 in a live state. At step 530, the application monitors whether a unicast heartbeat acknowledgment is received from a slave component 134, responsive to each multicast heartbeat request.

At step 540, the application 150 determines whether a threshold count of unicast heartbeat acknowledgments is not received from a slave component 134 in a live state from a last iteration (of the loop of the step 525) within a predefined time window. If so, the application 150 assigns an availability state to the slave component to indicate that the slave component may be unhealthy (step 550). If the application 150 determines that less than the threshold count of unicast heartbeat acknowledgments is not received from the slave component (step 540), or after the step 550, the method 500 may proceed to step 555, where the application 150 determines whether more slave components 134 in a live state remain. If so, the method 500 returns to the step 525 to process another slave component 134. Otherwise, the application 150 determines whether more multicast heartbeat requests remain (step 560). If so, the application 150 may return to the step 530 to process a unicast heartbeat acknowledgment for another multicast heartbeat request. After the step 560, the method 500 terminates.

Figure 6:
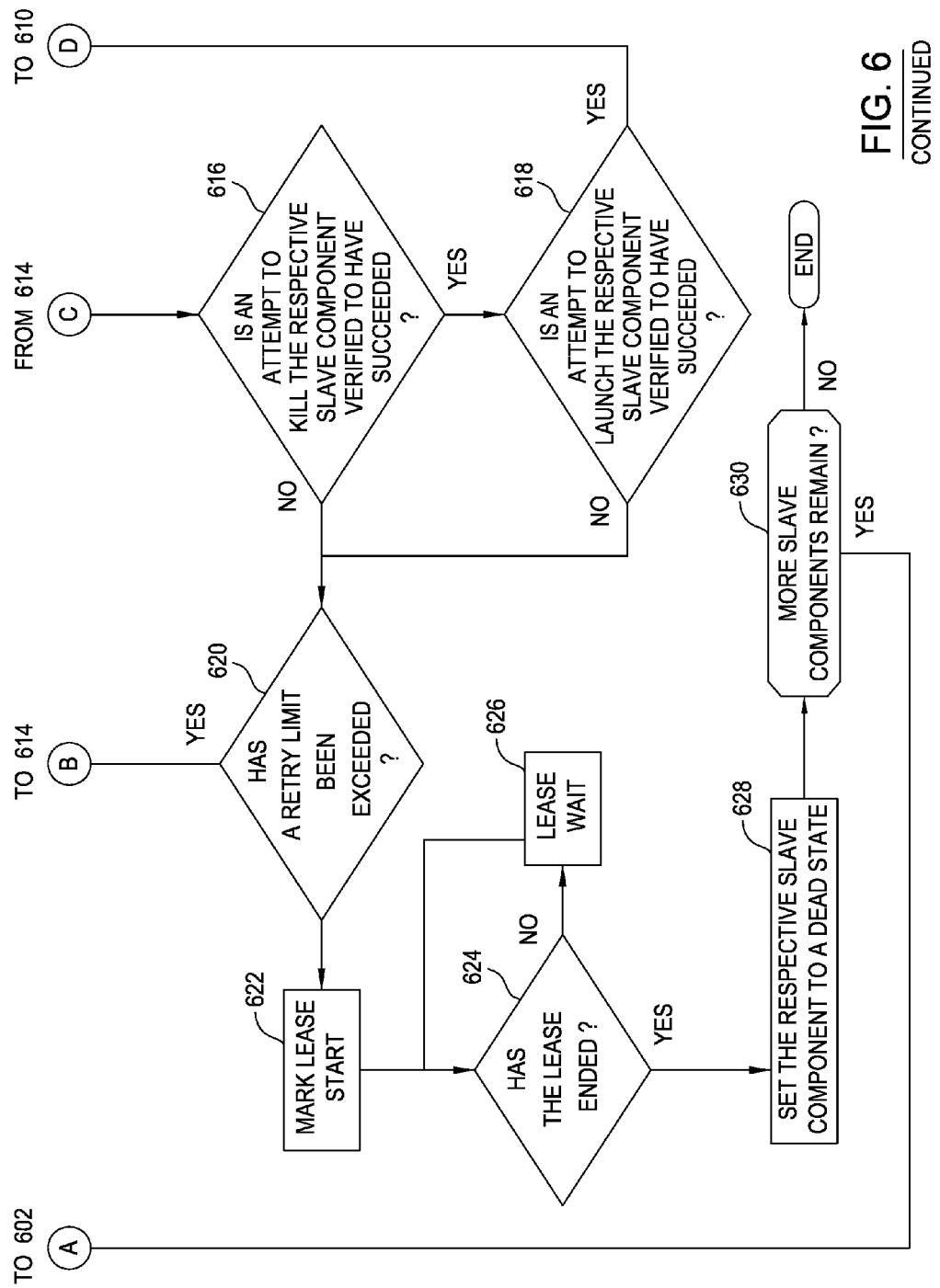
FIG. 6 is a flowchart depicting a method for a master component to participate in an availability protocol of a distributed system, according to one embodiment of the invention.

FIG. 6 is a flowchart depicting a method 600 for a master component to participate in an availability protocol of a distributed system, according to one embodiment of the invention. As shown, the method 600 begins at step 602, where the application 150 enters a loop for each slave component 134. At step 604, the application 150 sets the respective slave component 134 to a suspect state. At step 606, the application 150 determines whether a unicast heartbeat acknowledgment is received—or is received within a threshold percentage to be missed—responsive to a multicast heartbeat request. If not, the application 150 determines whether unicast heartbeat acknowledgments have been missed beyond a predefined threshold percentage (step 608). If not, the method 600 returns to the step 606.

However, if the application 150 determines that a unicast heartbeat acknowledgment is received—or is received within a threshold percentage to be missed (step 606)—the application 150 sets the respective slave component 134 to a live state (step 610), according to one embodiment. Whether the unicast heartbeat acknowledgment is received may be determined relative to a predefined window of time. In an alternative embodiment, the application 150 may determine whether a minimum threshold percentage of received heartbeat acknowledgements is received. The application 150 may then determine whether a unicast heartbeat acknowledgment is missed (step 612). If not, the method 600 returns to the step 612. Otherwise, the method 600 returns to the step 604.

As described above, in one embodiment, the application 150 determines whether the unicast heartbeat acknowledgment is received, relative to a predefined window of time. In one embodiment, the application 150 may use different windows of time, based on the type of slave component 134. In alternative embodiments, the application 150 may use different windows of time, based on node capability and/or network performance.

On the other hand, if the application 150 determines that a unicast heartbeat acknowledgment is missed beyond a threshold percentage (step 608), the application 150 sets the respective slave component 134 to an unknown state and begins to ignore any unicast heartbeat request from the respective slave component (step 614), according to one embodiment. The application 150 may then attempt to kill the respective slave component 134 and determine whether the attempt is successful (step 616). If so, the application 150 may then attempt to launch the respective slave component 134 and determine whether the attempt is successful (step 618). If so, the method 600 returns to step 610, and the application 150 no longer ignores unicast heartbeat requests from the respective slave component 134.

Alternatively, if either attempt is unsuccessful (step 616 or step 618), the application 150 may determine whether a retry limit has been exceeded (step 620), according to one embodiment. The application 150 may then mark a start of a lease for the respective slave component (step 622). The application 150 may then determine whether the lease has ended for the respective slave component (step 624). If not, the application 150 may wait on the lease for the respective slave component (step 626) and return to the step 624. Otherwise, the application 150 may set the respective slave component 134 to a dead state (step 628). At step 630, the application 150 may determine whether more slave components remain to be processed. If so, the method 600 may return to the step 602, where the application 150 processes a next slave component 134 in the loop. Otherwise, the method 600 terminates. Alternatively, instead of terminating the method 600, the application 150 may repeat the loop of the step 602.

Figure 7:
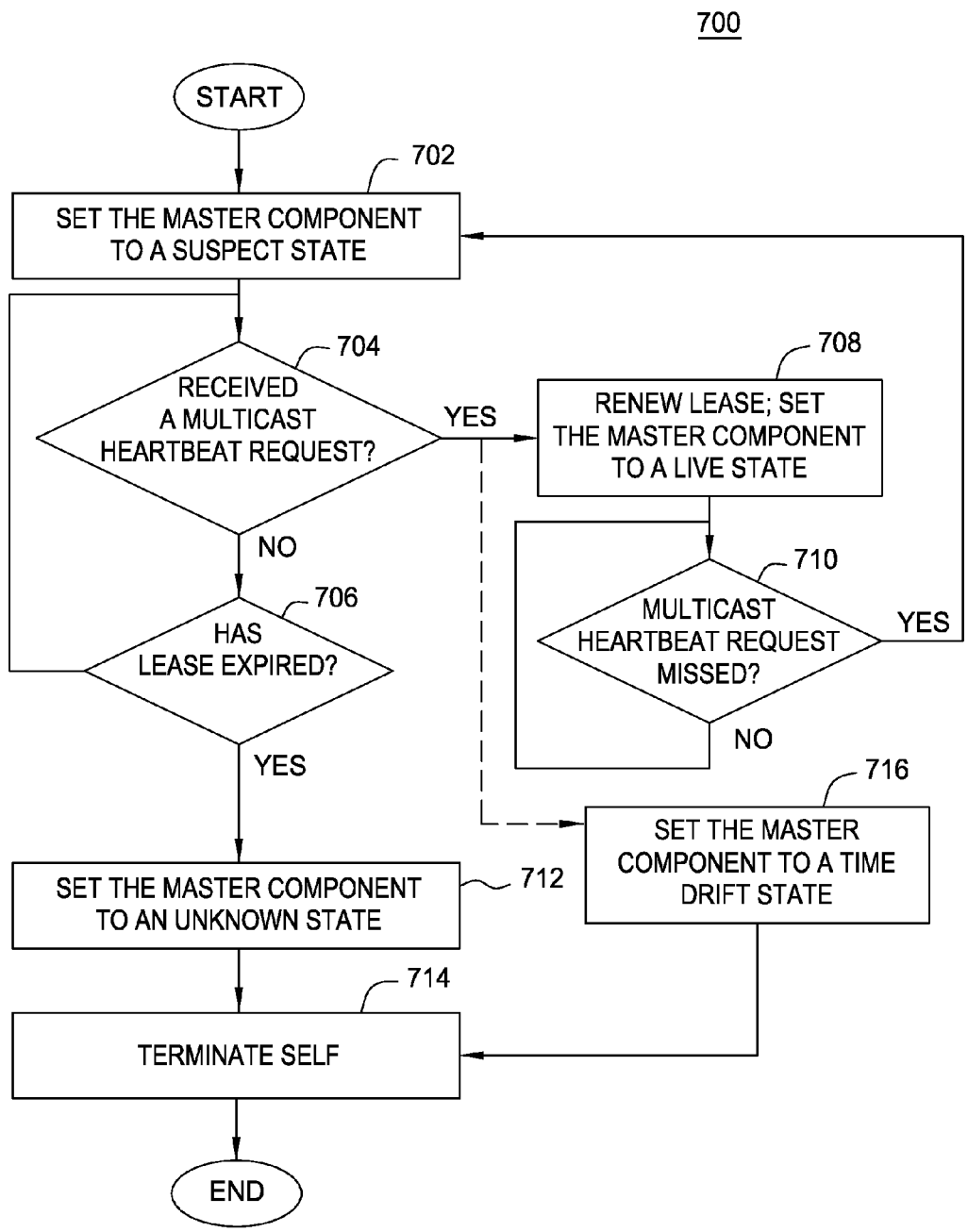
FIG. 7 is a flowchart depicting a method for a slave component to participate in an availability protocol of a distributed system, according to one embodiment of the invention.

FIG. 7 is a flowchart depicting a method 700 for a slave component 134 to participate in an availability protocol of a distributed system, according to one embodiment of the invention. As shown, the method 700 begins at step 702, where the slave component 134 sets the master component to a suspect state. At step 704, the slave component 134 determines whether a multicast heartbeat request is received from the master component. If not, the slave component 134 determines whether a lease for the slave component 134 has expired (step 706). If not, the method 700 returns to the step 704. Depending on the embodiment, the slave component 134 may also increment a counter based on a received multicast heartbeat request. Further, depending on the embodiment, the slave components 134 and the master component may determine whether a multicast heartbeat request or unicast heartbeat acknowledgment is received based on an adaptable time window and prior to changing state.

However, if a multicast heartbeat request is not received (step 704), the slave component may renew a lease for the slave component 134 and set the master component to a live state (step 708), according to one embodiment. The slave component 134 may then determine whether a multicast heartbeat request is missed (step 710). If not, the method 700 returns to the step 710. Otherwise, the method 700 returns to the step 702.

On the other hand, if the lease for the slave component 134 has expired (step 706), the slave component 134 may set the master component to an unknown state (step 712), according to one embodiment. At step 714, the slave component 134 may then terminate itself. After the step 714, the method 700 terminates. In some embodiments, if a multicast heartbeat request is not received (step 704), the method 700 may proceed to step 716, where the slave component 134 sets the master component to a time drift state. The slave component 134 may then terminate itself (step 714).

FIG. 8 depicts exemplary source code 802 defining a data structure of a multicast heartbeat acknowledgment and/or a unicast heartbeat response, according to one embodiment of the invention. As shown, the source code 802 includes a data type 804, a variable name 806 and a description 808. The data structure includes a data gram length, a header length, a signature, a message type, a command code, a domain identifier, a component type, a component identifier, a subcomponent identifier, a source IP address, a source port, an event identifier, a timestamp, a payload length, and payload bytes. The source IP address and source port of a sending component may be sent explicitly rather than extracted from TCP headers of the datagram, due to a possible lack of implementation on some operating system TCP libraries (e.g., TCP libraries that do not support packet introspection). The timestamp may be a local time stamp obtained from either a local operating system on which the master component or the slave components execute. The timestamp may be consolidated at the master component to enforce a de-configuration of a slave component 134 if the clock drift exceeds a predefined threshold, relative to a local clock of the master component. This is achieved because the slave component 134 shuts itself down—pursuant to the availability protocol disclosed herein—if the slave component 134 determines that the local timestamp of the slave component is out of drift from the timestamp transmitted on the multicast heartbeat request from the master component. The master component may subsequently de-configure the slave component 134.

In one embodiment, an administrative user and/or an application 150 may specify that a given slave component type as being critical for the entire distributed application. In such cases, if the master component determines that a slave component 134 of the given slave component type has entered an unknown state, the application 150 may determine to terminate itself (i.e., the application 150), thereby bringing down the entire distributed application within a predefined multiple of the lease period. Examples of slave component types include three slave component types (e.g., key server, index server, and translation server) shown in FIG. 2.

Advantageously, embodiments of the invention provide techniques for managing the availability of slave components executing in a distributed system. One embodiment of the invention provides a master server and a heartbeat protocol. The heartbeat protocol may define state machines for the master server and/or the slave components. The master server and/or the slave components may act in accordance with the state machines to manage availability of the slave components in the distributed system. For example, the heartbeat protocol may specify that the master server manages availability of the slave components by sending multicast heartbeat requests to the slave components and monitoring whether unicast heartbeat acknowledgments are received from the slave components. For instance, the master server may assign an "unknown" state to a slave component and attempt to kill and restart the slave component.

While the foregoing is directed to embodiments of the present invention, other and further embodiments of the invention may be devised without departing from the basic scope thereof, and the scope thereof is determined by the claims that follow.

What is claimed is:

1. A computer-implemented method to manage availability of a plurality of slave components executing in a distributed system by maintaining, for at least a first slave component selected from the plurality of slave components, an availability state indicating a health status of the first slave component, the method comprising:

sending a plurality of multicast heartbeat requests to the plurality of slave components executing in the distributed system;

for each multicast heartbeat request, monitoring whether a unicast heartbeat acknowledgment is received from the respective slave component, responsive to the respective multicast heartbeat request;

upon determining that a count of unicast heartbeat acknowledgments not received from the first slave component exceeds a first predefined threshold, transitioning from a slave live state for the first slave component to a slave suspect state for the first slave component;

wherein subsequent to transitioning to the slave suspect state, receipt of a unicast heartbeat acknowledgment from the first slave component causes a transition to the slave live state; and upon determining that the count of unicast heartbeat acknowledgments not received from the first slave component exceeds a second predefined threshold greater than the first predefined threshold, transitioning from the slave suspect state to a slave unknown state for the first slave component and by operation of one or more computer processors;

wherein subsequent receipt of a unicast heartbeat acknowledgment from the first slave component does not cause any transition from the slave unknown state to the slave suspect state or to the slave live state;

wherein subsequent to transitioning to the slave unknown state, a successful restart of the first slave component causes a transition to one of the slave live state and the slave suspect state.

2. The computer-implemented method of claim 1, wherein monitoring whether the unicast heartbeat acknowledgment is received from the respective slave component comprises incrementing a counter upon receiving the unicast heartbeat acknowledgment from the respective slave component.

3. The computer-implemented method of claim 1, wherein the method further comprises:

restarting the first slave component upon determining that the count of unicast heartbeat acknowledgments not received from the first slave component exceeds the second predefined threshold.

4. The computer-implemented method of claim 1, wherein one of the plurality of slave components is designated as a critical slave component, wherein the method is performed by a master process, and wherein the method further comprises:

upon determining that the count of unicast heartbeat acknowledgments not received from the critical slave component exceeds a predefined threshold, terminating the master process, whereby the distributed system is rendered unavailable.

5. The computer-implemented method of claim 1, wherein the method is performed by a master process, and wherein the method further comprises:

upon determining that the count of unicast heartbeat acknowledgments not received from at least one of the slave components exceeds a predefined threshold, restarting the master process.

6. The computer-implemented method of claim 1, wherein the distributed system includes a master process, the plurality of slave components, a node agent, a data store, and a component having an address space closed to the distributed system, wherein at least one of the plurality of slave components is configured to serve as a proxy for the component, wherein the master process is user-configurable via an administrative application, wherein the master process is configured to perform the operation for managing availability of the plurality of slave components.

7. The computer-implemented method of claim 6, wherein the master process is configured to operate according to a master state machine to monitor availability of the plurality of slave components, wherein the master state machine includes the slave live state, the slave suspect state, the slave unknown state, a slave kill state, a check kill state, a slave launch state, a check launch state, a retry limit state, a lease start state, a lease wait state, a lease end state, and a slave dead state;

wherein at least one slave component of the plurality of slave components is configured to operate according to a slave state machine to monitor availability of the master process, wherein the slave state machine includes a master live state, a master suspect state, a master unknown state, and a suicide state.

8. The computer-implemented method of claim 7, wherein each predefined threshold is expressed in terms of at least one of a number of acknowledgments and a percentage of acknowledgments, wherein the master state machine transitions:

(i) from the retry limit state to the slave unknown state upon determining a retry count does not exceed a predefined retry limit, wherein the retry count is incremented upon transitioning to the retry limit state, wherein retry count is specific to the given slave component; and (ii) from the retry limit state to the lease start state upon determining that the retry count exceeds the predefined retry limit.

9. The computer-implemented method of claim 8, wherein the master state machine further transitions:

(i) from the slave kill state to the check kill state upon an errorless execution of an kill operation on the given slave component;

(ii) from the check kill state to the slave launch state upon verifying that the given slave component is terminated;

(iii) from the slave launch state to the check launch state upon an errorless execution of a launch operation on the given slave component;

(iv) from the check launch state to the slave live state upon verifying that the given slave component is launched;

(v) from the slave kill state to the retry limit state upon detecting an error during execution of the kill operation on the given slave component;

(vi) from the check kill state to the retry limit state upon determining that the given slave component is not terminated;

(vii) from the slave launch state to the retry limit state upon detecting an error during execution of the launch operation on the given slave component; and (viii) from the check launch state to the retry limit state upon determining that the given slave component is not launched.

10. The computer-implemented method of claim 9, wherein the slave state machine transitions:

(i) from the master live state to the master suspect state upon non-receipt of a predefined number of multicast heartbeat requests from the master process within a second predefined duration of time;

(ii) from the master live state to the time draft state upon a time drift threshold being exceeded;

(iii) from the master suspect state to the master unknown state a lease expiration; and (iv) from the master suspect state to the master live state upon a lease renewal.

11. The computer-implemented method of claim 10, wherein at least one of the plurality of slave components is designated as a non-critical component, wherein the master process is terminated upon determining that the count of unicast heartbeat acknowledgments not received from the critical slave component exceeds the second predefined threshold, independent of any health status of the at least one non-critical component;

wherein the proxy for the component is configured to analyze a state of the component using inter-process communication (IPC) and operating system primitives and transmit availability information of the component to the master process according to a predefined availability protocol of the distributed system.

12. The computer-implemented method of claim 11, wherein each unicast heartbeat acknowledgment and multicast heartbeat request comprises a predefined data structure containing a plurality of fields including a datagram length, a header length, a signature, a message type, a command code, a domain identifier, a component type, a component identifier, a subcomponent identifier, a source Internet Protocol (IP) address, a source port, an event identifier, a timestamp, a payload length, and a set of payload bytes, wherein the first predefined duration of time and the second predefined duration of time are distinct.

13. The computer-implemented method of claim 12, wherein monitoring whether the unicast heartbeat acknowledgment is received from the respective slave component comprises incrementing a counter upon receiving the unicast heartbeat acknowledgment from the respective slave component;

wherein the method further comprises restarting the slave component upon determining that the count of unicast heartbeat acknowledgments not received from one of the slave components exceeds the second predefined threshold;

wherein one of the plurality of slave components is designated as a critical slave component, and wherein the method further comprises, upon determining that the count of unicast heartbeat acknowledgments not received from the critical slave component exceeds a third predefined threshold, terminating the master process, whereby the distributed system is rendered unavailable.

14. The computer-implemented method of claim 13, wherein the method further comprises, upon determining that the count of unicast heartbeat acknowledgments not received from at least one of the slave components exceeds the third threshold, restarting the master process, wherein the first threshold, the second threshold, and the third threshold are distinct;

wherein the master process is restarted without having to restart any of the plurality of slave components;

wherein at least one slave component of the plurality of slave components is configured to terminate itself upon determining that a local timestamp associated with the at least one slave component is out of drift from a timestamp of one of the plurality of multicast heartbeat requests;

wherein each threshold is determined based on a slave component function type, a message performance history, a node condition, and a network condition, and wherein each threshold is distinct.

15. A computer program product for performing an operation to manage availability of a plurality of slave components executing in a distributed system by maintaining, for at least a first slave component selected from the plurality of slave components, an availability state indicating a health status of the first slave component, the computer program product comprising:

a computer-readable storage device having computer-readable program code embodied therewith, the computer-readable program code comprising:

computer-readable program code configured to send a plurality of multicast heartbeat requests to the plurality of slave components executing in the distributed system;

computer-readable program code configured to monitor, for each multicast heartbeat request, whether a unicast heartbeat acknowledgment is received from the respective slave component, responsive to the respective multicast heartbeat request;

computer-readable program code configured to, by operation of one or more computer processors when executing the computer-readable program code and upon determining that a count of unicast heartbeat acknowledgments not received from the first slave component exceeds a first predefined threshold, transition from a slave live state for the first slave component to a slave suspect state for the first slave component;

wherein subsequent to transitioning to the slave suspect state, receipt of a unicast heartbeat acknowledgment from the first slave component causes a transition to the slave live state; and computer-readable program code configured to, upon determining that the count of unicast heartbeat acknowledgments not received from the first slave component exceeds a second predefined threshold greater than the first predefined threshold, transition from the slave suspect state to a slave unknown state for the first slave component;

wherein subsequent receipt of a unicast heartbeat acknowledgment from the first slave component does not cause any transition from the slave unknown state to the slave suspect state or to the slave live state;

wherein subsequent to transitioning to the slave unknown state, a successful restart of the first slave component causes a transition to one of the slave live state and the slave suspect state.

16. The computer program product of claim 15, wherein the computer-readable program code configured to monitor whether the unicast heartbeat acknowledgment is received from the respective slave component comprises:

computer-readable program code configured to increment a counter upon receiving the unicast heartbeat acknowledgment from the respective slave component.

17. The computer program product of claim 15, wherein the computer-readable program code further comprises:

computer-readable program code configured to restart the first slave component upon determining that the count of unicast heartbeat acknowledgments not received from the first slave component exceeds the second predefined threshold.

18. The computer program product of claim 15, wherein one of the plurality of slave components is designated as a critical slave component, wherein the operation is performed by a master process, and wherein the computer-readable program code further comprises:

computer-readable program code configured to terminate the master process upon determining that the count of unicast heartbeat acknowledgments not received from the critical slave component exceeds a predefined threshold, whereby the distributed system is rendered unavailable.

19. The computer program product of claim 15, wherein the operation is performed by a master process, and wherein the computer-readable program code further comprises:

computer-readable program code configured to restart the master process upon determining that the count of unicast heartbeat acknowledgments not received from at least one of the slave components exceeds a predefined threshold.

20. A system to manage availability of a plurality of slave components executing in a distributed system by maintaining, for at least a first slave component selected from the plurality of slave components, an availability state indicating a health status of the first slave component, the system comprising:

one or more computer processors; and a memory containing a program, which when executed by the one or more computer processors is configured to perform an operation comprising:

sending a plurality of multicast heartbeat requests to the plurality of slave components executing in the distributed system;

for each multicast heartbeat request, monitoring whether a unicast heartbeat acknowledgment is received from the respective slave component, responsive to the respective multicast heartbeat request;

upon determining that a count of unicast heartbeat acknowledgments not received from the first slave component exceeds a first predefined threshold, transitioning from a slave live state for the first slave component to a slave suspect state for the first slave component;

wherein subsequent to transitioning to the slave suspect state, receipt of a unicast heartbeat acknowledgment from the first slave component causes a transition to the slave live state; and upon determining that the count of unicast heartbeat acknowledgments not received from the first slave component exceeds a second predefined threshold greater than the first predefined threshold, transitioning from the slave suspect state to a slave unknown state for the first slave component;

wherein subsequent receipt of a unicast heartbeat acknowledgment from the first slave component does not cause any transition from the slave unknown state to the slave suspect state or to the slave live state;

wherein subsequent to transitioning to the slave unknown state, a successful restart of the first slave component causes a transition to one of the slave live state and the slave suspect state.

21. The system of claim 20, wherein monitoring whether the unicast heartbeat acknowledgment is received from the respective slave component comprises incrementing a counter upon receiving the unicast heartbeat acknowledgment from the respective slave component.

22. The system of claim 20, wherein the operation further comprises:

restarting the first slave component upon determining that the count of unicast heartbeat acknowledgments not received from the first slave component exceeds the second predefined threshold.

23. The system of claim 20, wherein one of the plurality of slave components is designated as a critical slave component, wherein the operation is performed by a master process, and wherein the operation further comprises:

upon determining that the count of unicast heartbeat acknowledgments not received from the critical slave component exceeds a predefined threshold, terminating the master process, whereby the distributed system is rendered unavailable.

24. The system of claim 20, wherein the operation is performed by a master process, and wherein the operation further comprises:

upon determining that the count of unicast heartbeat acknowledgments not received from at least one of the slave components exceeds a predefined threshold, restarting the master process.

\* \* \* \* \*